F. McKAY.
PROTECTIVE CHECK.
APPLICATION FILED MAY 31, 1918.

1,288,089.

Patented Dec. 17, 1918.

UNITED STATES PATENT OFFICE.

FRANK McKAY, OF CLINTON, OKLAHOMA.

PROTECTIVE CHECK.

1,288,089.   Specification of Letters Patent.   Patented Dec. 17, 1918.

Application filed May 31, 1918. Serial No. 237,638.

*To all whom it may concern:*

Be it known that I, FRANK MCKAY, a citizen of the United States, residing at Clinton, in the county of Custer and State of Oklahoma, have invented certain new and useful Improvements in Protective Checks, of which the following is a specification.

My invention relates to protective checks, having means whereby the location of the signature of the maker of the check is employed to prevent the check being raised.

An important object of the invention is to provide a check of the above mentioned character, having a large range of use, and which is convenient to draw.

Other objects and advantages of the invention will be apparent during the course of the following description.

In the accompanying drawing forming a part of this specification,

The figure is an elevation of my improved check.

The numeral 1 designates the check as a whole, provided upon its upper portion with the name 2 of the bank upon which the check is drawn, and above this name with the name 3 of the location of the bank, and a space 4 for the reception of the date, and a further space 5 to receive the specific amount for which the check is drawn. Beneath the name 2 of the bank is a line 6, designated "Pay to the order of", and beneath this line a second line 7 adapted to receive in writing the amount for which the check is drawn.

Beneath the line 7 are lines designated "Not over" $5.00, $10.00, $15.00, etc., and adapted to receive the signature of the maker of the check, depending upon the amount for which the check is drawn. If the check is drawn for $5.00 then the maker signs upon the line 8 opposite the $5.00.

At the ends of the check, are portions which are horizontally and vertically ruled, as shown at 9 and 10, for the reception of the signature of the maker of the check. These lines cross, as shown.

In each portion, the horizontal lines are designated by amounts 11, in dollars, the words "Not over" appearing in proximity thereto. The amounts 11 are arranged in numerical order, as shown.

When the lines 10 are employed for receiving the signature of the maker, the check is arranged on end, so that these lines become horizontal. At the left end of the lines 10, when horizontal, are amounts 12, in dollars, with the words "Not over" in proximity thereto. To more readily distinguish the end portions, the sets of amounts 12 are arranged at the opposite longitudinal edges of the check, thereby causing the check to be turned in opposite directions, from the horizontal, to use the different sets of lines 10.

By employing the lines 9 and 10, at a right angle to each other, the check is condensed, and has a large range of use.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, I claim:

A check provided upon the end portions thereof with horizontal and vertical sets of lines, the horizontal and vertical sets of lines on each end portion intersecting and being arranged at substantially a right angle to each other, the horizontal lines being provided at their ends with columns receiving numbers designating the maximum amount of the check, the vertical sets of lines being provided with horizontal columns of numbers designating the maximum amount of the check, said horizontal columns being arranged at the opposite edges of the check, the horizontal and vertical lines being adapted for the reception of the signature of the maker of the check.

In witness whereof I have hereunto set my name to this specification in the presence of two subscribing witnesses.

FRANK McKAY.

Witnesses:

C. T. FINCH,
SAM B. ROBERTS.

Copies of this patent may be obtained for five cents each, by addressing the "Commissioner of Patents, Washington, D. C."